(12) United States Patent
Spence

(10) Patent No.: US 9,188,260 B2
(45) Date of Patent: Nov. 17, 2015

(54) CRIMP EVIDENT SEAL

(75) Inventor: Scott Lee Spence, Elkhart, IN (US)

(73) Assignee: NIBCO Inc., Elkhart, IN (US)

( * ) Notice: Subject to any disclaimer, the term of this patent is extended or adjusted under 35 U.S.C. 154(b) by 947 days.

(21) Appl. No.: 12/512,320

(22) Filed: Jul. 30, 2009

(65) Prior Publication Data
US 2010/0025992 A1 Feb. 4, 2010

Related U.S. Application Data

(60) Provisional application No. 61/085,560, filed on Aug. 1, 2008.

(51) Int. Cl.
*F16L 13/14* (2006.01)

(52) U.S. Cl.
CPC ............. *F16L 13/148* (2013.01); *F16L 13/142* (2013.01); *F16L 2201/10* (2013.01)

(58) Field of Classification Search
USPC .................... 285/104, 286.2, 382.7, 910, 374
See application file for complete search history.

(56) References Cited

U.S. PATENT DOCUMENTS

| 3,539,205 | A | * | 11/1970 | Burl, Jr. et al. ................ 285/374 |
| 4,368,894 | A | * | 1/1983 | Parmann ........................ 285/345 |
| 5,205,594 | A | * | 4/1993 | Stoll et al. ..................... 285/322 |
| 5,496,073 | A | * | 3/1996 | Grenier ............................ 285/39 |
| 5,603,530 | A | * | 2/1997 | Guest ............................ 285/105 |
| 6,260,891 | B1 | | 7/2001 | Foering et al. |
| 6,488,319 | B2 | * | 12/2002 | Jones ............................ 285/374 |
| 6,581,983 | B1 | | 6/2003 | Viegener |
| 6,719,299 | B2 | | 4/2004 | Mühle |
| 6,726,256 | B2 | | 4/2004 | Viegener |
| 6,874,823 | B2 | | 4/2005 | Viegener |
| 7,475,918 | B2 | * | 1/2009 | Kaimer et al. ................ 285/374 |
| 7,823,932 | B2 | * | 11/2010 | Webb et al. ................... 285/374 |
| 2006/0175829 | A1 | | 8/2006 | Kaimer et al. |
| 2007/0246938 | A1 | | 10/2007 | Webb et al. |

FOREIGN PATENT DOCUMENTS

| CA | 2368526 | | 8/2001 |
| DE | 29521672 | | 3/1998 |
| DE | 19842186 | | 9/1998 |
| DE | 102005015278 | | 10/2006 |
| DE | 602004002083 | T2 | 4/2007 |
| DE | 102005062738 | | 7/2007 |
| DE | 102006008317 | A1 | 8/2007 |
| DE | 102006027151 | A1 | 12/2007 |
| EP | 1128115 | | 8/2001 |
| EP | 1249655 | | 3/2002 |
| EP | 1201982 | A2 * | 5/2002 |
| EP | 1361386 | | 11/2003 |

(Continued)

*Primary Examiner* — David E Bochna
(74) *Attorney, Agent, or Firm* — Price Heneveld LLP

(57) ABSTRACT

An O-ring has a flange which includes a plurality of slots, such that, when inserted into an annular groove of a pipe fitting before crimping, the slots allow the flow of fluid therethrough, such that an installation would not pass pressure tests until such time as a proper crimp has been made. Such a design allows the use of conventional push-on pipe connections by utilizing a unique O-ring seal which works in conjunction with standard push-on crimp-type pipe fittings and conventional crimping tools for subsequently sealing the connection. The O-ring is either circular or elliptical in cross section and the slots define equally spaced annular segments.

22 Claims, 8 Drawing Sheets

(56) References Cited

FOREIGN PATENT DOCUMENTS

| EP | 1424523 | 6/2004 |
| EP | 1486713 | 6/2004 |
| EP | 1555473 | 8/2006 |
| EP | 1837574 | 9/2007 |
| EP | 1775507 | 10/2008 |
| ES | 2162781 | 8/2000 |
| JP | 2004108447 | 4/2004 |
| JP | 2004108448 | 4/2004 |

* cited by examiner

CRIMP EVIDENT SEAL

CROSS-REFERENCE TO RELATED APPLICATIONS

This application claims priority under 35 U.S.C. §119(e) and the benefit of U.S. Provisional Application No. 61/085,560 entitled CRIMP EVIDENT SEAL, filed on Aug. 1, 2008, by Scott Lee Spence, the entire disclosure of which is incorporated herein by reference.

BACKGROUND OF THE INVENTION

The present invention relates to plumbing fittings and particularly to seals for crimp connections between fittings.

In recent years, crimp-on connections have replaced the typical solder connection in copper and other metallic plumbing systems used in homes and industrial applications. Typically, the female pipe fitting will include an annular groove into which an O-ring is positioned and a male fitting inserted through the O-ring and the annular groove subsequently crimped to provide a tight seal. When numerous such connections are made in a plumbing system, particularly in large commercial installations, not infrequently crimps are missed. Frequently, O-ring seals which have not been crimped will initially pass pressure tests but, over time, will leak if the junction is not properly crimped.

There is a need, therefore, for a system which will purposely leak at a connection which has been made but not properly crimped. There have been several attempts at solving this problems, including, for example, providing frangible bands around crimp fittings which, until crimped, remain in place but, once crimped, the typically plastic ring fractures and reveals the fact that the crimp has been made. Some attempts have been made also to provide specialized O-ring designs which purposely allow leakage until such time as a proper crimp has been made.

SUMMARY OF THE INVENTION

The present invention solves the problem with improperly crimped connections by providing, in one embodiment, a ring-type seal, such as an O-ring, having a flange which includes a plurality of slots, such that, when inserted into an annular groove of a pipe fitting before crimping, the slots allow the flow of fluid therethrough, such that an installation will not pass pressure tests until such time as a proper crimp has been made. Such a design allows the use of conventional push-on copper pipe connections by utilizing a unique O-ring seal which works in conjunction with standard push-on crimp-type pipe fittings and conventional crimping tools for subsequently sealing the connection. Also, the O-ring, which is seated in an annular groove of a fitting, will rotate about its annular axis when engaged by a pipe or another fitting being inserted into a fitting. This assures that any burrs on the end of the pipe, if scarring the O-ring during insertion, such a blemish will be rotated out of the sealing surfaces between the pipe and fitting.

Ring seals of one embodiment of the present invention comprise a generally annular body having a generally circular or elliptical cross section and integrally including a flange or lip extending from the body around the periphery thereof. Typically, such seals are O-rings with an integrally molded lip which includes a plurality of spaced-apart slots formed therein to provide a fluid flow path through the lip until such time as a crimp is made which compresses the O-ring between two pipe fittings, completing the seal. The O-ring is dimensioned such that, prior to crimping, a fluid leakage path is provided by the slots formed in the flange or lip of the O-ring seal. In another embodiment of the invention, a coupling joint between two plumbing components is made using such a seal.

These and other features, objects and advantages of the present invention will become apparent upon reading the following description thereof together with reference to the accompanying drawings.

DETAILED DESCRIPTION OF THE PREFERRED EMBODIMENT

Figure 1:
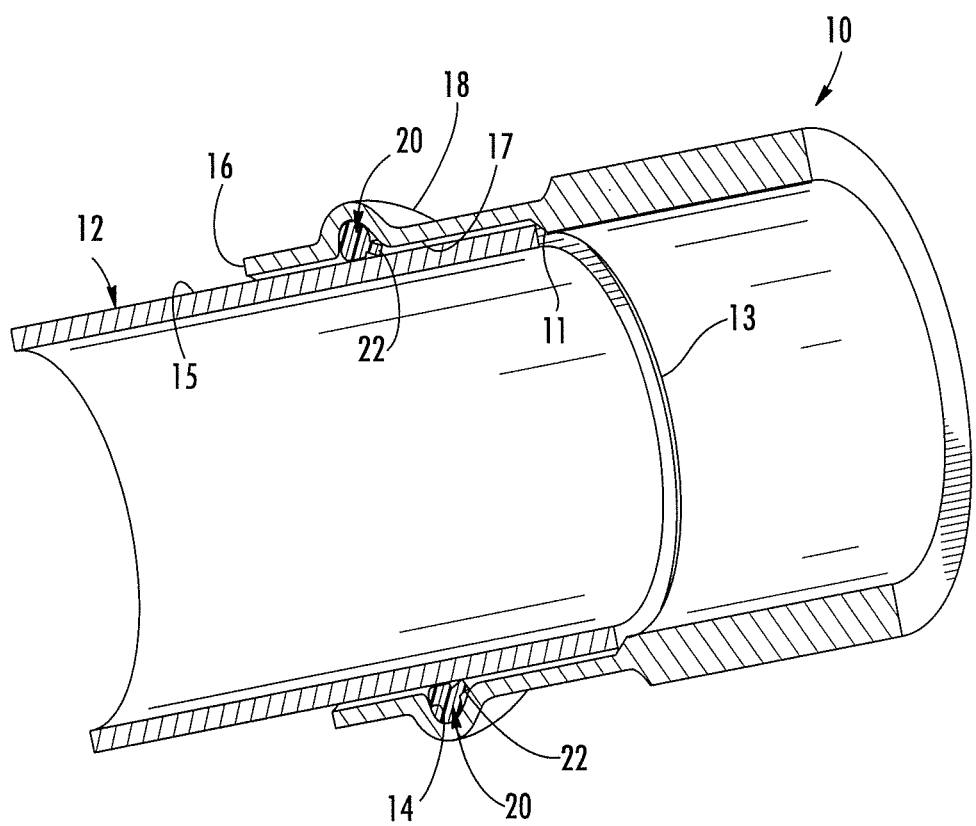
FIG. 1 is a fragmentary cross-sectional view of a pipe and plumbing fitting employing an O-ring seal of the present invention, shown prior to crimping.
Figure 2:
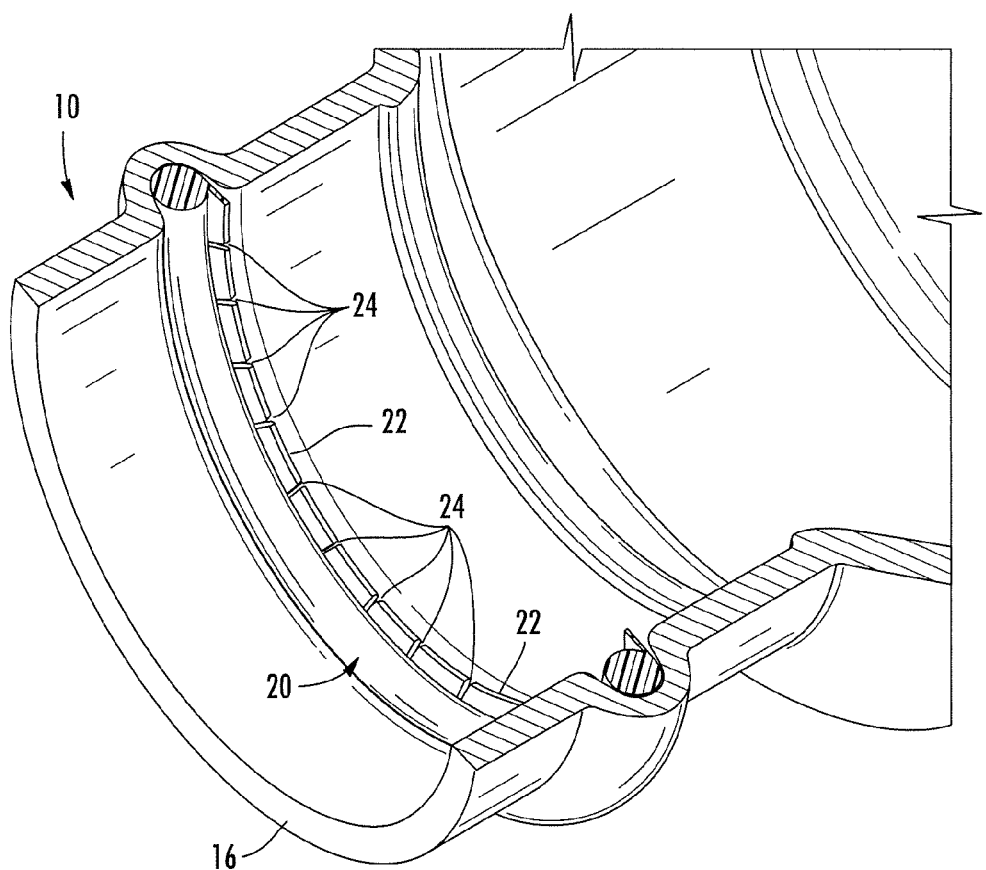
FIG. 2 is an enlarged fragmentary perspective view of a female plumbing fitting including the O-ring seal shown in FIG. 1.
Figure 3:
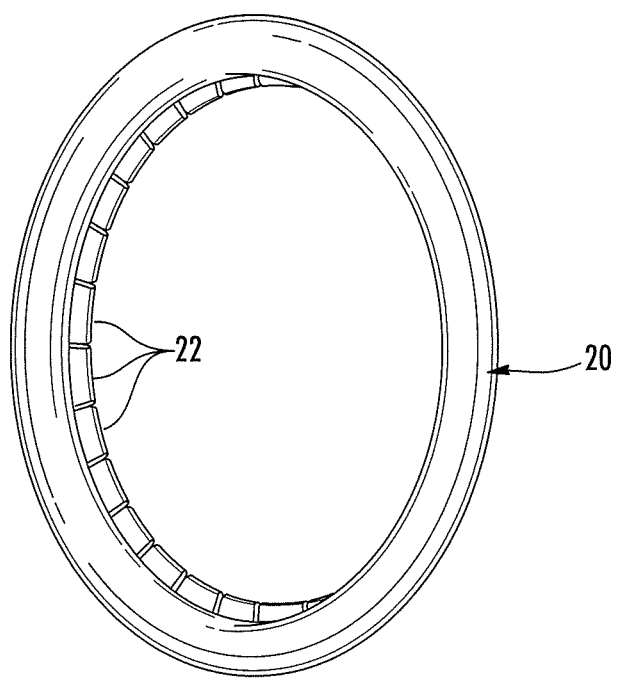
FIG. 3 is an enlarged perspective view of an O-ring seal embodying the present invention.

Referring initially to FIG. 1, there is shown a first pipe fitting 10 having a female fitting which provides a coupling from a second pipe fitting, such as a supply conduit 12. Conduit 12 is frequently referred to as a pipe, tube, or other vernacular in the trade. Fitting 10 can be any number of plumbing fittings, such as an adapter for different size piping, a threaded member for receiving a faucet or valve or other plumbing device, a coupling having an end mirroring the left end shown, or another conduit for extending the flow path of water. Typically, fittings 10 and 12 are made of copper. Fitting 10 includes an open end 16 and an internal annular concave groove 14 (frequently referred to in the trade as a bead) spaced inwardly from its open end 16 to hold an O-ring seal 20 of the present invention. End 13 of conduit 12 is inserted into the open end 16 of the fitting 10 until end 13 passes beyond O-ring 20. Frequently, the fitting, such as fitting 10, will have an annular shoulder 11 which engages the end 13 of conduit 12 and serves as a stop to the entry of the conduit well beyond the seal 20. Subsequently, a commercially available crimping tool is employed and engages the outer circumferential surface 18 of groove 14 and crimps O-ring 20 into sealing engagement between the outer surface 15 of conduit 12 and the inner surface 17 of fitting 10.

In order to assure that such crimping has properly taken place, the O-ring 20 has a segmented flange 22 which, as seen in FIGS. 2-10, is integrally formed with O-ring seal 20 and extends radially from the body of seal 20. The flange 22 is segmented into, for example, about eight segments for smaller seals, such as the ½ inch seal shown in FIGS. 4-6, or about 12 segments for larger seals, such as the 2 inch seal shown in FIGS. 7-10. The segmented flange 22 is formed by a plurality of slots 24 spaced equally around the periphery of the O-ring 20. The segmented flange engages the outer surface 15 of conduit 12 loosely until a crimp is made. This allows fluid, such as water, to pass through the slots 24, to provide a detectable leak at the junction between the conduit 10 and fitting 12 within a plumbing system in the event a joint has not been crimped.

Typically, once, for example, the plumbing system of a floor for a commercial building is completed, the system for that floor will be isolated and pressure tested for leaks. Leaks are frequently pressure tested by applying air pressure initially at some location within the plumbing system which is otherwise sealed from the remainder of the overall system and monitoring the pressure, which may be at a level of 100 psi for air or 80 psi for water. These pressures may vary depending on a given location and plumbing practice. If the pressure is maintained over a period of time, the system is leak proof and the sealed crimping has been successful. If, however, the pressure drops, the faulty connection must be isolated. If a crimp has not been made or if a crimp is ineffective, the pressure will drop, indicating that there is a leak at a junction. If air is being used as a test media, the workman will spray a soap solution on the joints to detect air bubbles indicating where the leak occurs. If the junction has not been crimped, which will be evident from inspecting the outside of the junction, a crimp is made until the seal is completed. If an improper crimp exists, an attempt can be made to recrimp it, and, if that is unsuccessful, the fitting must be cut out and replaced with an adapter or junction fitting to replace the section removed due to the improper crimping. When water is employed as the media for testing the integrity of the system, the leakage of water will be readily apparent either where no crimp has taken place or where a defective crimp has been made. It is important to complete the leak detection and correct any leaks prior to completion of a plumbing installation and before enclosing the plumbing system with drywall or other materials.

Figure 4:
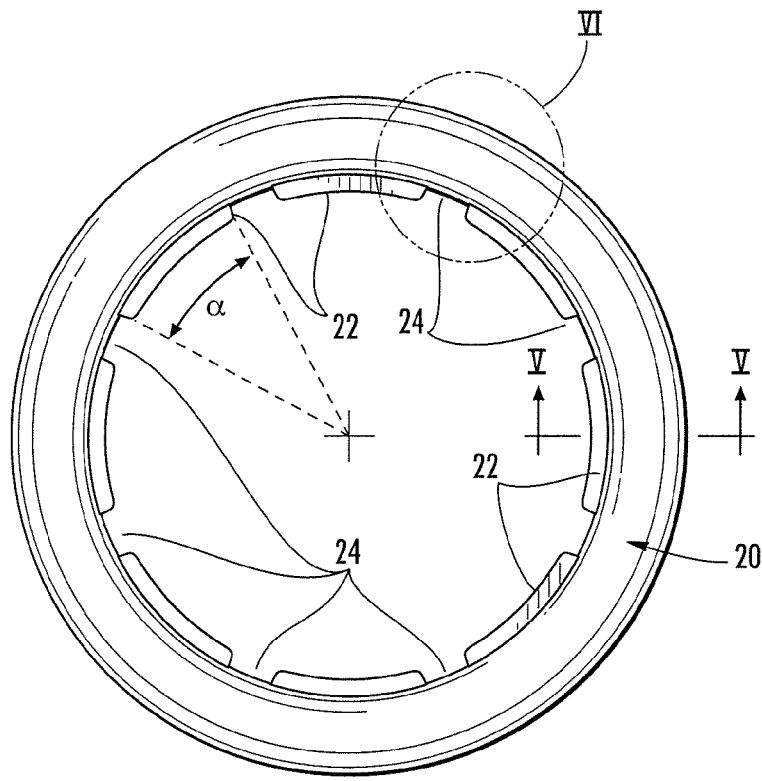
FIG. 4 is a front elevational view of an O-ring embodying the present invention having a first diameter.
Figure 5:
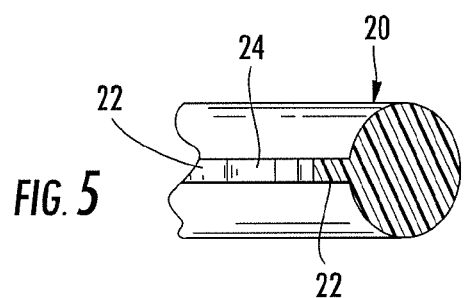
FIG. 5 is a cross-sectional view of the O-ring shown in FIG. 4, taken along section lines V-V in FIG. 4.
Figure 6:
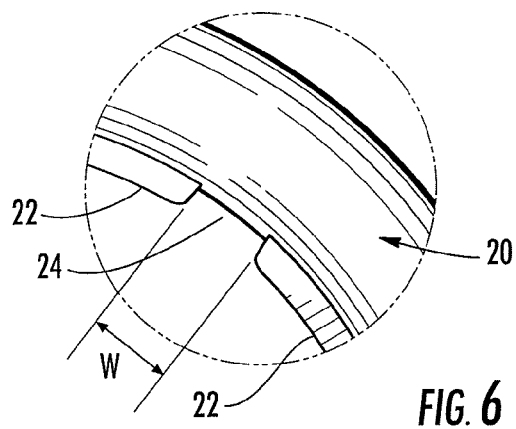
FIG. 6 is an enlarged view of the circled areas VI shown in FIG. 4.
Figure 7:
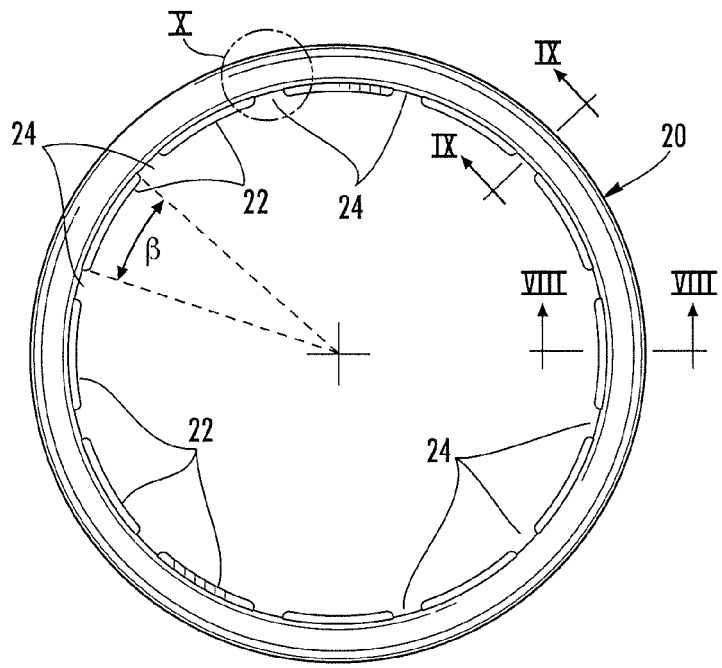
FIG. 7 is a front elevational view of an O-ring embodying the present invention having a larger diameter than that shown in FIG. 4.
Figure 13:
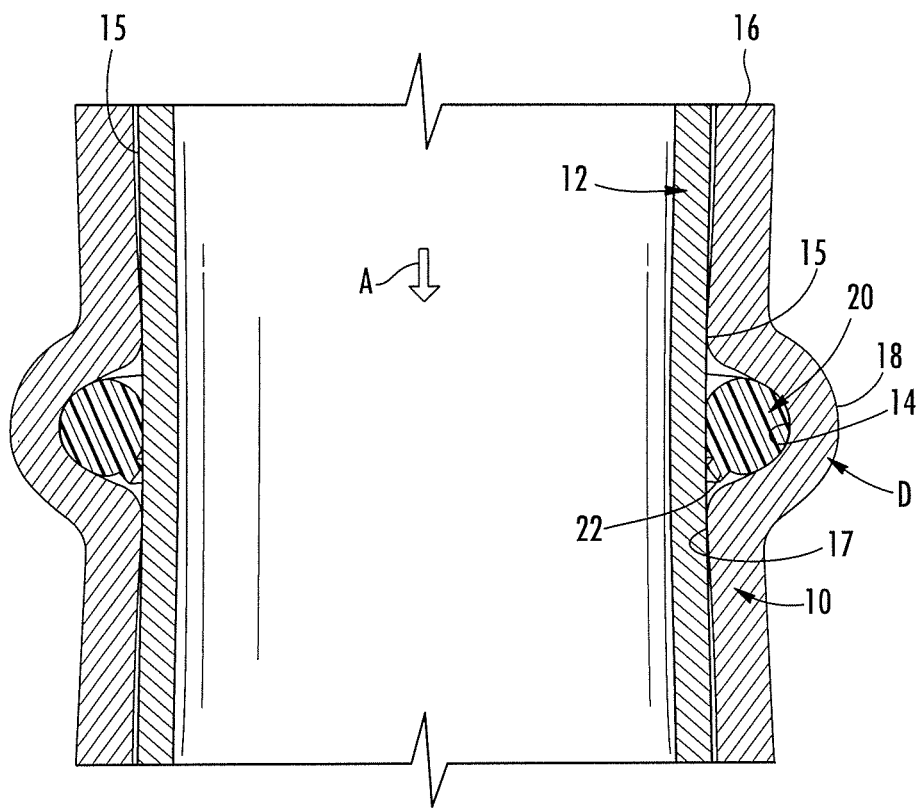
FIG. 13 is an enlarged cross-sectional view of the crimped connection between the pipe and female fitting into which it is inserted and sealed.

When properly crimped, O-ring 20 prevents leakage when the pressurized fluid flows through the connection in the direction indicated by arrow A in FIG. 13. Two different sizes of the O-ring seals 20 are shown in detail in FIGS. 4-6 and 7-10, respectively. In one embodiment for use with smaller pipes, such as a ½" diameter copper pipe as shown in FIGS. 4-6, the groove 14 in fitting 10 had a radius of about 0.05 inches. The seal was made of a polymeric material, such as ethylene propylene diene elastomer with a generally circular body having a diameter of about 0.103 inches. Other polymeric or rubber based materials typically used for O-ring seals could also be used. The rectangular flange had a mean thickness of about 0.03 inches and extended radially outwardly from the circular body of seal 20 about 0.020 inches. The generally rectangular shaped slots 24 (FIG. 6) had an annular width W of about 0.050 inches. For smaller seals 20, i.e., less than about 1 inch, eight equally spaced slots provide the desired leak indicating function. In these embodiments, the arcuate flanges circumscribe an arc α (FIG. 4) of about 35°.

Figure 8:
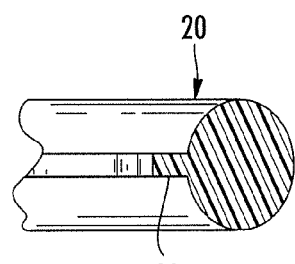
FIG. 8 is an enlarged cross-sectional view of the O-ring taken along section lines VIII-VIII in FIG. 7.
Figure 9:
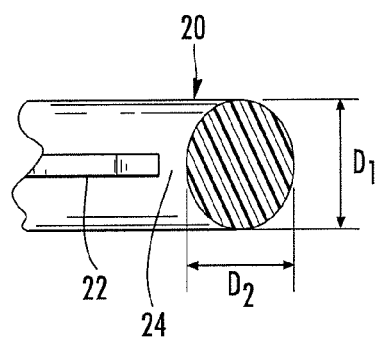
FIG. 9 is an enlarged cross-sectional view of the O-ring taken along section IX-IX in FIG. 7.

For larger sized seals (i.e., 1 inch or greater in diameter), a greater number of flanges 22 are employed. Thus, for example, as seen in FIGS. 7-10, for an O-ring having a diameter of 2 inches, twelve equally spaced flanges 22 are employed. Although seals 20 smaller than 2 inches also have a circular cross section, as shown in FIGS. 4-6, larger diameter seals, such as a 2 inch diameter seal shown in FIGS. 7-10, have an elliptical cross section, as described below, to accommodate the use of a conventional crimping tool. Thus, for example, as seen in FIGS. 8 and 9, the cross section of O-ring seal 20 has a major diameter $D_1$ of about 0.17 inches (±0.005 inches) and the minor diameter $D_2$ of about 0.151 inches (±0.004 inches). The flange 22 extends outwardly from the mid-section of the major diameter of the O-ring seal 20, as seen in FIG. 8. Again, the flange 22 has a thickness of about 0.03 inches and extends outwardly from the elliptical body of O-ring seal 20 shown in FIGS. 7-10 a distance of about 0.041 inches. O-ring seals 20 smaller than the 2 inch O-ring have a circular as opposed to an elliptical cross section and the 2 inch and larger diameter O-rings will employ an elliptical diameter with the minor axis being positioned within the groove 14 of a fitting, as described in connection with FIGS. 11-13 below.

Figure 10:
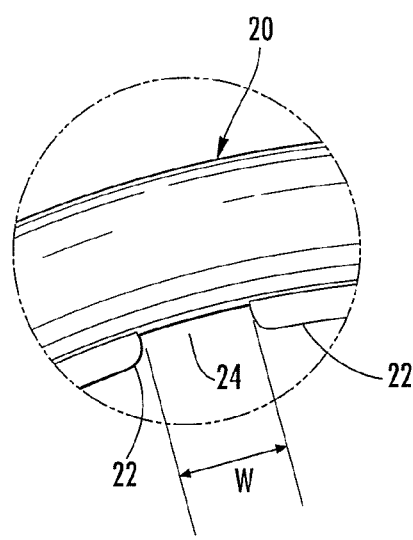
FIG. 10 is an enlarged view of the circled area X in FIG. 7.

In the embodiment shown in FIGS. 7-10 and in other embodiments in which twelve equally spaced flanges are employed, the width W of the slots 24, as seen in FIG. 10, is about 0.1 inches. Each of the arcuate flanges 22 circumscribe an angle β of about 24°. In each of the embodiments, the material is ethylene propylene diene elastomer, as noted above, having a hardness of 70 shore and conforms to ASTM D2000 Class M3DA714. Having described the typical different sized O-ring seals 20 of the present invention, the installation and crimping of the seal is illustrated by the sequential diagrams of FIGS. 11-13 now described.

Figure 11:
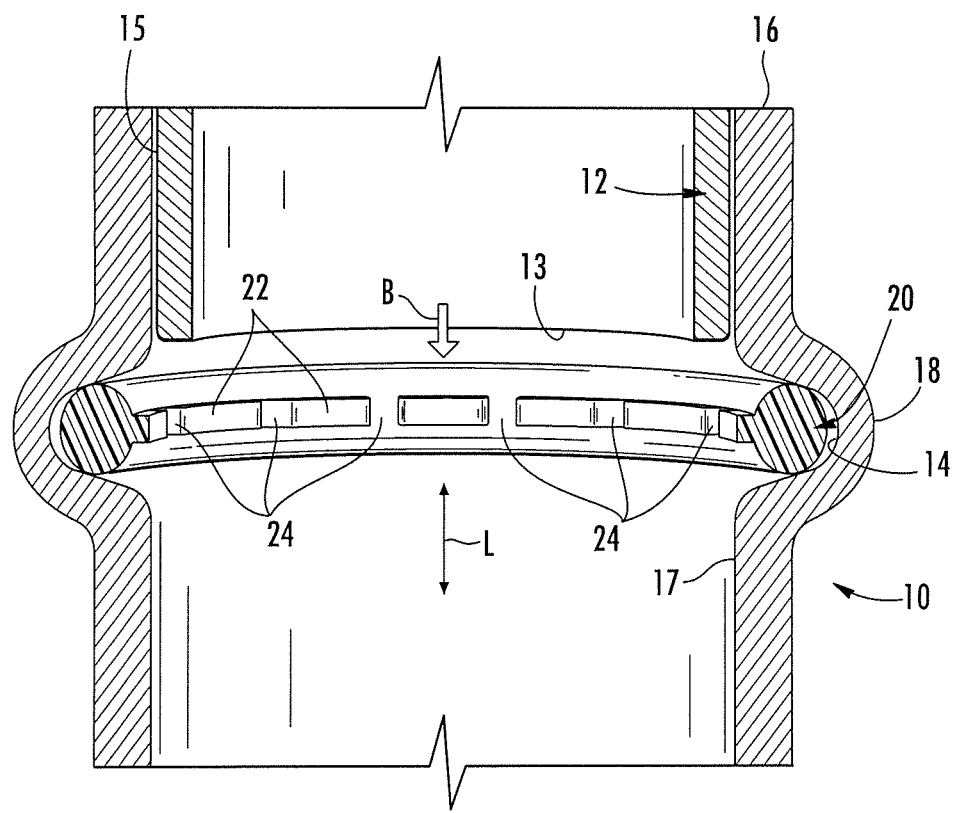
FIG. 11 is an enlarged cross-sectional view showing the initial step of inserting a pipe into a fitting including an O-ring of the type shown in FIGS. 4-10.
Figure 12:
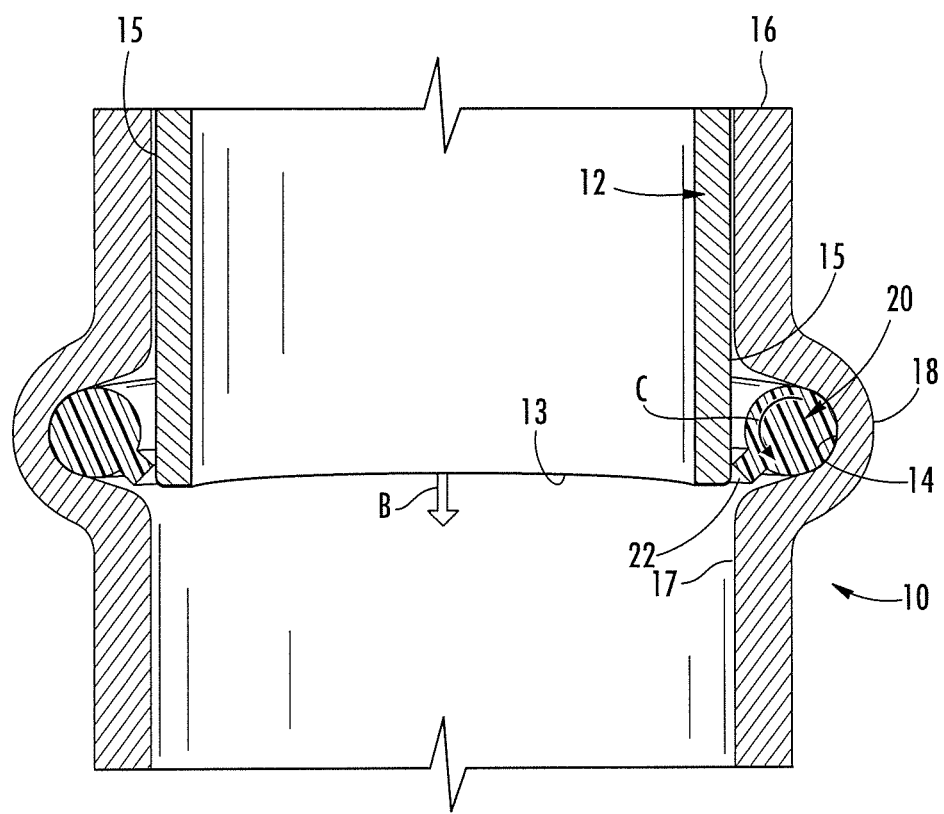
FIG. 12 is an enlarged fragmentary cross-sectional view of the pipe and fitting shown in FIG. 11 as the pipe is advanced into contact with the O-ring of the present invention prior to crimping.

As seen in FIG. 11, a fitting 10, which can be any type of copper coupling or fitting used in a plumbing connection, includes an internal annular groove 14 into which an O-ring seal 20 of the present invention is inserted with the inwardly projecting flanges 22 aligned axially (i.e., orthogonally) with the longitudinal axis L of fitting 10. Conduit 12 is inserted into the open end of fitting 10 in a direction indicated by arrow B in FIG. 11. As the forward edge 13 of conduit 12 engages flange 22, as seen in FIG. 12, the O-ring seal 20 rotates on its annular axis, as shown by arrow C in FIG. 12, approximately 30°. This movement moves any area of O-rings 20 which may have been damaged by a rough edge 13 of a conduit 12 into a non-sealing area of the O-ring, which does not make contact with the outer surface 15 of conduit 12 or the inner surface of groove 14. The conduit 12 is advanced beyond the O-ring 20 to a position, as illustrated in FIG. 1, in which the end 13 typically engages a stop 11 in the fitting 10. After this, a conventional crimping tool is applied to the area D (FIG. 13) around the entire 360° periphery of the bead or groove 14 to compress the O-ring seal 20 and flanges 22, as seen in FIG. 13, to complete the sealed connection between the outer diameter 15 of the pipe or conduit 12 and the inner surface 17 of fitting 10.

As seen in FIG. 13, this deforms the either circular or elliptical cross section of the O-ring seal 20 compressing it against the inner surface of groove or recess 14 and the outer surface 15 of the conduit 12. As noted above, the two fittings which are being coupled together in sealed relationship may take any form of a typical copper plumbing fitting, including pipes, double ended connectors having a bead or groove on opposite ends for receiving conduits 12 from opposite ends for coupling ends of conduits, threaded fittings for coupling a smooth conduit to a threaded fitting, such as a valve, or any different diameter adapters. Thus, the leak evident seal 20 of the present invention can be employed in a variety of plumbing environments where two fittings are to be coupled utilizing a push and crimp fitting and an O-ring to a provide leak evident system for a plumbing installation.

The flange 22 on the O-ring 20 also assists in providing the installer a tactile consistent feel as the pipe is inserted into the fitting. This and the rotating of the ring seal helps prevent actually contacting and damaging the rubber O-ring sealing surface, which is one of the greatest causes of leaking press fittings. Additionally, flange 22 helps to retain the fitting on the pipe during the dry fitting of a plumbing system before crimping occurs. This is a great aid to the installer since the fittings won't fall off of the pipe prior to crimping.

It will become apparent to those skilled in the art that various modifications to the preferred embodiment of the invention as described herein can be made without departing from the spirit or scope of the invention as defined by the appended claims.

The invention claimed is:

1. A seal in a crimp connection with a first pipe fitting having an open end and an annular concave groove formed within said first pipe fitting in spaced relationship to said open end and a second pipe fitting inserted into said open end of said first pipe fitting, said seal in a crimp connection comprising:
    a unitary ring seal having a compressible polymeric body, said body comprising an O-ring including an integrally formed flexible polymeric flange extending around said ring seal and extending from said body radially inwardly at a distance engaged by an end of the second pipe fitting when the second pipe fitting is inserted into the open end of the first pipe fitting, wherein the ring seal is rotated as a result of insertion of the second pipe fitting into said open end of the first pipe fitting; and
    a plurality of slots formed in spaced relationship in said flange; said slots being configured to permit fluid to pass through the slots prior to crimping of the first and second pipe fittings and prevent passage of fluid through the slots subsequent to the crimping of the first and second pipe fittings.

2. The seal as defined in claim 1 wherein said ring seal is circular in cross section.

3. The seal as defined in claim 1 wherein said ring seal is elliptical in cross section.

4. The seal as defined in claim 1 wherein said flange is divided into from 8 to 12 arcuate segments by said slots.

5. The seal as defined in claim 4 wherein said arcuate segments are equally spaced.

6. The seal as defined in claim 1 wherein said polymeric body is ethylene propylene diene elastomer.

7. A crimp connection for pipe fittings, the crimp connection for a pipe fitting comprising:
    a first pipe fitting having an open end and annular concave groove formed within said first fitting in spaced relationship to said open end;
    a second pipe fitting inserted into said open end of said first pipe fitting; and
    an O-ring having a polymeric body with an integrally formed flexible polymeric flange extending from said body radially inwardly at a distance engaged by an end of the second pipe fitting when inserted into said open end of said first pipe fitting, wherein said O-ring is seated within said annular concave groove of said first pipe fitting; and wherein said integrally formed flexible polymeric O-ring flange includes a plurality of spaced slots formed in spaced relationship in said flange around said O-ring, wherein the slots of the O-ring flexible polymeric flange are configured to permit fluid flow through the spaced slots prior to crimping of the first and second pipe fittings and prevent the passage of fluid through the slots subsequent to the crimping of the first and second pipe fittings, wherein said first and second pipe fittings are crimped at said concave groove and mechanically secures the first and the second pipe fittings together and seals the fluid connection between said first and second fittings, and wherein said flange is engaged by an end of said second pipe fitting as the second pipe fitting is inserted into said open end of said first pipe fitting, and wherein the O-ring is rotated during the insertion of the second pipe fitting into said first pipe fitting.

8. The crimp connection as defined in claim 7 wherein said O-ring is circular in cross section.

9. The crimp connection as defined in claim 7, wherein said O-ring is elliptical in cross section.

10. The crimp connection as defined in claim 7 wherein said slots form 8 to 12 arcuate segments.

11. The crimp connection as defined in claim 7 wherein said slots form a plurality of arcuate segments which are equally spaced.

12. The crimp connection as defined in claim 7 wherein said polymeric body is ethylene propylene diene elastomer.

13. The crimp connection as defined in claim 7 wherein said first pipe fitting is an adapter and said second pipe fitting is a conduit.

14. A crimp connection for pipe fittings, the crimp connection for pipe fittings comprising:
    a first pipe fitting having an open end and an annular concave groove formed within said first pipe fitting in spaced relationship to said open end;
    a second pipe fitting having end for insertion into said open end of said first pipe fitting; and
    an O-ring having a polymeric body with an integrally formed flexible segmented polymeric flange extending from said body in a direction radially inwardly, said O-ring seated within said annular concave groove, wherein said segmented polymeric flange includes a plurality of spaced slots, said segmented polymeric flange being engaged by said end of said second pipe fitting during insertion of the second pipe fitting into said first pipe fitting, wherein the slots of the O-ring flexible polymeric flange are configured to permit fluid flow through the spaces slots prior to crimping of the first and second pipe fittings and prevent the passage of fluid through the slots subsequent to the crimping of the first and second pipe fittings, and wherein the O-ring is rotated during insertion of said second pipe fitting into said first pipe fitting.

15. The crimp connection as defined in claim 14 wherein said O-ring is rotated on its annular axis in said annular concave groove by said end of said second pipe fitting as said end of said second pipe fitting engages said segmented polymeric flange and passes said annular concave groove.

16. The crimp connection as defined in claim 15 wherein said O-ring is rotated about 30° when said second pipe fitting passes by said annular concave groove as said second pipe fitting engages said segmented polymeric flange.

17. The crimp connection as defined in claim 16 wherein said segmented polymeric flange is divided into from 8 to 12 arcuate segments by said slots.

18. A crimp connection for pipe fittings, the crimp connection for pipe fittings comprising:

a first pipe fitting having an open end and annular concave groove formed within said first fitting in spaced relationship to said open end;

a second pipe fitting inserted into said open end of said first pipe fitting; and an O-ring having a polymeric body with an integrally formed flexible segmented polymeric flange extending from said body radially inwardly at a distance engaged by an end of the second pipe fitting during insertion of the second pipe fitting into said open end of said first pipe fitting, wherein said O-ring is seated within said concave groove of said first pipe fitting; and wherein said flange includes a plurality of spaced slots formed in spaced relationship in said flange around said O-ring, wherein fluid passes though the slots of the O-ring flange prior to crimping of the first an second pipe fittings and prevents passage of fluid through the slots subsequent to the crimping of the first and second pipe fittings, and wherein said first and second pipe fittings are crimped in the area of said groove and mechanically securing the first and second pipe fittings together and deforming the O-ring to seal said first and second fittings.

19. The crimp connection as defined in claim 18 wherein said O-ring is circular in cross section.

20. The crimp connection as defined in claim 18 wherein said O-ring is elliptical in cross section.

21. The crimp connection as defined in claim 18 wherein said segmented polymeric flange is divided into from 8 to 12 arcuate segments by said slots.

22. The crimp connection as defined in claim 18 wherein said segmented polymeric flange includes a plurality of arcuate segments which are equally spaced.

* * * * *

UNITED STATES PATENT AND TRADEMARK OFFICE
CERTIFICATE OF CORRECTION

| | | |
|---|---|---|
| PATENT NO. | : 9,188,260 B2 | Page 1 of 1 |
| APPLICATION NO. | : 12/512320 | |
| DATED | : November 17, 2015 | |
| INVENTOR(S) | : Spence | |

It is certified that error appears in the above-identified patent and that said Letters Patent is hereby corrected as shown below:

In The Specification

Column 1, line 31, "problems" should be --problem--;

Column 5, line 6, "a provide" should be --provide a--;

In The Claims

Column 6, line 19, delete "," after --7--;

Column 6, line 36, after "having" insert --an--;

Column 6, line 48, "spaces" should be --spaced--; and

Column 7, line 16, "an" should be --and--.

Signed and Sealed this
Eighth Day of March, 2016

Michelle K. Lee
*Director of the United States Patent and Trademark Office*